No. 618,762. Patented Jan. 31, 1899.
S. F. ALBRIGHT.
TEA KETTLE.
(Application filed Oct. 30, 1897.)
(No Model.)
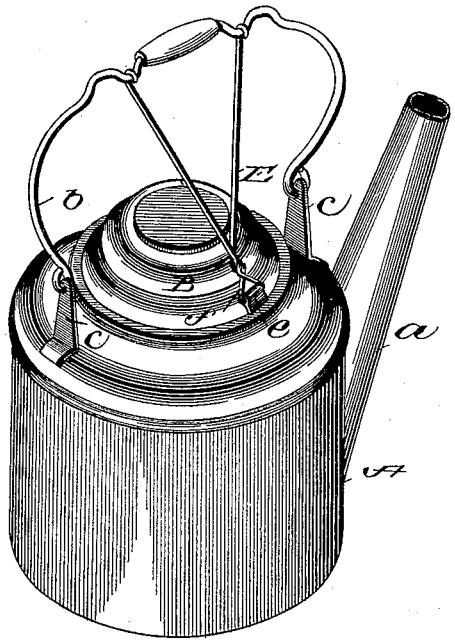
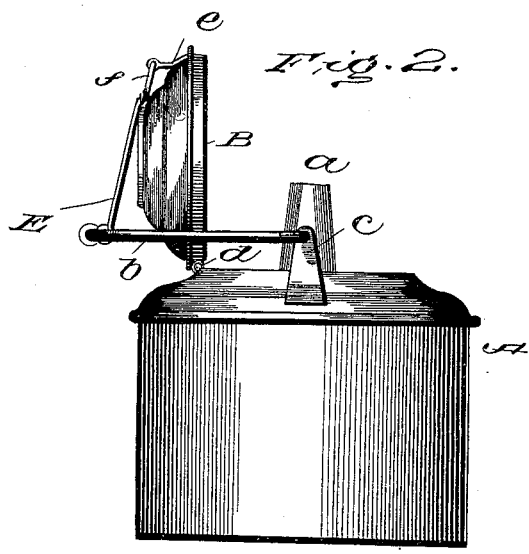
Witnesses
Inventor
Sarah F. Albright
by Wm Hunter Myers,
her Attorney.
THE NORRIS PETERS CO., PHOTO-LITHO., WASHINGTON, D. C.

UNITED STATES PATENT OFFICE.

SARAH F. ALBRIGHT, OF SIDNEY, OHIO.

TEA-KETTLE.

SPECIFICATION forming part of Letters Patent No. 618,762, dated January 31, 1899.

Application filed October 30, 1897. Serial No. 656,861. (No model.)

*To all whom it may concern:*

Be it known that I, SARAH F. ALBRIGHT, a citizen of the United States, residing at Sidney, in the county of Shelby and State of Ohio, have invented certain new and useful Improvements in Tea-Kettles, of which the following is a specification, reference being had therein to the accompanying drawings.

My invention relates to an improvement in tea-kettles; and it has for its object the production of means whereby the movement of the bail in either direction will operate the lid of the kettle, the lid-operating means being simple in construction and operation and arranged in such position as to give most advantageous results.

The invention will first be described in connection with the accompanying drawings and then pointed out in the claims.

Figure 1 of the drawings is a perspective view of a tea-kettle provided with my improved lid-operating means, the lid being shown closed. Fig. 2 is an elevation of the same, the lid being shown raised.

Referring to the drawings, A represents a tea-kettle of ordinary construction, having a spout $a$ and a bail $b$, the latter being pivoted in ears $c$, secured to the kettle in the same vertical plane as the spout $a$. The lid B of the kettle is of usual construction, but hinged at $d$ to the body of the kettle, this hinged connection being in a plane at right angles to the plane of the bail-ears, all as clearly shown in the drawings.

In providing the kettle with my improved lid-operating means I secure a lug or ear $e$ to the lid directly opposite the hinged connection $d$, and in this ear $e$ I pivotally secure one end of a link E, the other end of which is pivotally secured to the bail $b$, as shown. For simplicity of construction I prefer to form the link E of wire, twisted at its central portion, leaving a loop $f$ at the lower end, which loop is pivotally secured to the ear $e$, the ends of the wire being separated and secured to the bail, one on each side of that portion which is grasped by the hand in lifting the kettle.

In operation it will be seen that by turning the bail on its pivotal connection in the bail-ears the lid through link E will be raised or lowered as the bail is either turned downward or raised to a vertical position, that when the lid is closed upon the kettle the bail will always be in an upright position ready and convenient to be grasped by the hand, and that when the bail is turned downward to raise the lid the latter, owing to its being opened at a right angle to the plane of the bail, will be in such position as to shield the hand from the steam escaping from the kettle.

While I have shown and described my invention as particularly applicable to tea-kettles, it is fully apparent that it is equally effective with similar cooking vessels, such as coffee and tea pots, covered pans, and the like.

If desired, the lid may be made heavier than the bail and link, so that when the lid has been raised it will be automatically closed by simply releasing the bail.

Having thus described my invention, what I claim as new, and desire to secure by Letters Patent, is—

1. In a cooking utensil having bail-ears and a hinged lid, the combination, with a bail pivotally secured in the bail-ears, of a link pivotally secured at one end to the lid at a point opposite the hinge of the latter and having branched ends passed around the bail, one on each side of the hand-bail, substantially as described.

2. In a cooking utensil having bail-ears and a hinged lid, the combination, with a bail pivotally secured in the bail-ears, of a link made of a single length of wire, twisted at its central portion to leave a loop at the lower end, said loop being pivotally secured to the lid at a point opposite the hinge of the latter, the ends of the wire being separated and passed loosely around the bail, one on each side of the handhold, substantially as described.

In testimony whereof I affix my signature in presence of two witnesses.

SARAH F. ALBRIGHT.

Witnesses:
JAMES E. WAY,
J. F. HICKEY.